United States Patent [15] 3,655,364
Evans et al. [45] Apr. 11, 1972

[54] PROCESS FOR TREATING LOW-IRON NICKELIFEROUS ORES

[72] Inventors: David J. I. Evans, Site No. 9, R.R. No. 6, North Edmonton, Alberta, Canada; Nicolas Zubryckyj, Praca Roamos de Azewedo 254, Sao Paulo, Brazil

[22] Filed: Feb. 27, 1970

[21] Appl. No.: 15,242

[52] U.S. Cl. ................................... 75/103, 75/101, 75/82, 75/119
[51] Int. Cl. ..................................................... C22b 23/04
[58] Field of Search ........................... 75/7, 119, 101, 103, 82

[56] References Cited

UNITED STATES PATENTS 2,400,098 5/1946 Brogdon ................................... 75/82
2,913,331 11/1959 Dean ........................................ 75/7

*Primary Examiner*—Dewayne Rutledge
*Assistant Examiner*—G. T. Ozaki
*Attorney*—Frank I. Piper and Arne I. Fors

[57] ABSTRACT

Low iron nickeliferous weathered serpentine is mixed with an iron oxide bearing additive material. The mixture is calcined under controlled reducing conditions to convert contained nickel values to a leachable stage. The calcine material is then leached with an aqueous ammoniacal ammonium carbonate solution in contact with free oxygen containing gas to extract nickel values. The additive is substantially free of substances which would contaminate the leach solution and is substantially free of nickel or contains nickel in such form or amount that the additive is not, in itself, amenable to treatment by the above described calcining and leaching process. The additive is added in an amount sufficient to provide an iron content in the mixture of up to about 60% by weight.

4 Claims, No Drawings

PROCESS FOR TREATING LOW-IRON NICKELIFEROUS ORES

This invention relates to the recovery of nickel from oxidic nickel bearing ores. MOre particularly, the invention relates to an improvement in the known reduction-ammonium carbonate leach process which permits treatment of nickeliferous weathered serpentine laterite (also referred to herein as "weathered serpentine") ores whereby a substantially improved yield of nickel may be obtained therefrom.

There are large deposits of weathered serpentine ores in various areas of the world and these deposits together with nickeliferous limonite laterite ores (also referred to herein simply as "limonite ores") commonly associated with such deposits, constitute the world's largest known reserves of nickel and cobalt. Weathered serpentine ores are characterized by a relatively low iron content, generally less than 30% by weight, and a high magnesium content, generally more than 5% by weight. Limonite ores, on the other hand, are characterized by relatively high iron content, e.g. 30–60% by weight, and a low magnesium content, e.g. 5% or less.

Numerous processes have been proposed to treat these ores to recover contained nickel and other non-ferrous metals such as cobalt, but few of these have proven commercially feasible. One process, which was commercially employed for a time in Cuba, is the well known Nicaro process. In this process, comminuted ore is first roasted at a temperature of about 650° C. in a reducing atmosphere, such as a 75–25% hydrogen-nitrogen mixture, to convert substantially all the nickel to a leachable state. The resulting calcine is cooled and subsequently leached in an aqueous ammoniacal ammonium carbonate solution. Leaching is carried out at moderate temperatures, e.g. about 45° C. under oxidizing conditions for a period of time sufficient to dissolve substantially all the soluble nickel and cobalt values in the calcine. The leach solution is separated from the undissolved residue and treated for the recovery of the dissolved nickel and cobalt.

The Nicaro process, and various modifications thereof, permit the extraction of 70–95% of the nickel from limonite ores, but substantially lower nickel extractions, generally well below 70%, are obtained when the same processes are applied to weathered serpentine ores. These lower nickel extractions, of course, reflect unfavourably in the economics of the known processes when they are applied to treatment of weathered serpentine ores rather than limonite ores.

It is also known, for example, from U.S. Pat. No. 2,913,331, to extract nickel from relatively low iron content serpentine ores by mixing such material with nickeliferous limonite ores which have a relatively high iron content. The mixed ores are subjected to the conventional "Nicaro type" reduction-ammonium carbonate leach process outlined hereinabove. According to the aforesaid patent, whereas this ore-mixing procedure apparently leads to a very substantial recovery of the nickel in both the serpentine and limonite ores when treated together, this is only because the nickeliferous limonite is susceptible to very high nickel extractions so that the average extraction is high even though the recovery of the contained nickel in the serpentine ores is extremely low.

We have now found, however, that weathered serpentine ores can be made more responsive to the reduction-ammonium carbonate leach process by mixing such ores, prior to reduction roasting, with iron oxide bearing materials which materials are not, in themselves, responsive to or economically treatable by the reduction-ammonium carbonate leach process. Contrary to what would be expected from the prior art teachings, this procedure does not result in an averaging down of nickel extraction but surprisingly increases nickel extraction even though the added iron oxide bearing material is totally barren of nickel or contains insufficient nickel to permit economic recovery when it is treated by itself or contains nickel in a form not extractable by the reduction-ammonium carbonate leach process when it is treated in such process by itself.

An important practical affect of this discovery is to enable utilization of substantially nickel-free or very low nickel content iron oxide containing materials, which often are readily available in proximity to weathered serpentine ore deposits, to enable economic treatment of the serpentinic ores by the reduction-ammonium carbonate leach process. For example, most lateritic nickel deposits include a top layer of "overburden" which is very low in nickel, containing, for example, about 0.1 to 0.8% nickel, by weight, and high in hydrated iron oxide, containing, for example, about 50% iron. Also, the leach tailings derived from the treatment of nickeliferous limonite ores by the reduction-ammonium carbonate leach process contain a high portion of iron oxide and hydrated iron oxide together with small quantities of residual nickel. According to the present invention, therefore, mixtures of these materials with weathered serpentine ores may be treated economically by the reduction-ammonium carbonate leach process notwithstanding that none of the materials alone can be treated economically by the process.

The present invention, therefore, involves an improved method for increasing nickel extractions from low iron nickeliferous weathered serpentine ore when such ore is treated by the process wherein the ore is calcined under reducing conditions and the calcined ore is leached with ammoniacal ammonium carbonate solution in the presence of free oxygen to extract solubilized nickel values, which improved method comprises mixing said weathered serpentine ore with an iron oxide bearing material which is substantially free of impurities that would tend to introduce unwanted contaminants into said ammoniacal ammonium carbonate leach solution and which is substantially nickel free or contains nickel in such form or amount that said material is not in itself amenable to treatment by said process. The term "low iron weathered serpentine" as used herein means those ores which have an iron content, in the range of about 5 to about 30% by weight, and a magnesium content in the range of about 5 to about 20% by weight. The term "iron oxide" as used herein is intended to include the various different oxides of iron such as $Fe_3O_4$ and $Fe_2O_3$ as well as hydrated ferric oxide and mixtures of these.

In a preferred embodiment of the invention, the added iron oxide bearing material is low nickel content limonitic ore or overburden such as is commonly associated with lateritic nickel ore deposits. Another particularly suitable additive material is tailings derived from the leaching of reduction-roasted nickeliferous limonite. The exact amount of iron oxide bearing material added is not critical to the general operability of the method of the invention but optimum results are obtained when it is added in sufficient amount to adjust the iron content of the mixture to within the range of about 30% to about 50% by weight.

In carrying out the process according to the present invention, with the exception of the initial step of mixing the starting ore with iron oxide bearing material, as described in detail hereinafter, the specific procedures may be essentially the same as those known in the art and described, for example, in U.S. Pat. No. 3,141,765.

Preferably, the weathered serpentine ore is first dried to reduce the free moisture content thereof to below about 5% by weight. The drying step is important in order to enable control of the water vapour content of the furnace atmosphere in the subsequent reduction step so as to minimize reduction of iron values in the material to a form soluble in the leach solution. The ore may be flash dried by dropping it in a tower against a rising current of hot gases, rotary dried by tumbling the material in a cylinder against or with a current of hot gases and/or rabblehearth dried by mechanical mixing of the material on a horizontal hearth in a current of hot gases. Of course, other conventional drying procedures may also be employed.

According to the invention, iron oxide bearing material is blended with the weathered serpentine ore prior to reduction roasting. The amount of added iron oxide bearing material is not critical inasmuch as any amount will function to give some increase in nickel recovery from the weathered serpentine ore with which it is mixed. In general, however, the maximum amount of iron oxide bearing material that can usefully be added is that which would provide a mixture having 60% by weight iron content. For optimum results, sufficient iron oxide bearing material is added to provide a mixture containing at least about 20% by weight iron and preferably from about 30% to about 50% by weight iron. The iron oxide bearing material may be added to the ore either before or after the drying step. Any iron oxide bearing material that will not tend to introduce unwanted contaminants into the system may be employed for the purposes of this invention. The material may be nickel-free or it may contain nickel in an amount or in a form which is not amenable to economic recovery by the reduction-ammonium carbonate leach process. The preferred iron oxide source material is the high iron, low nickel material which normally overlies nickeliferous laterite ore deposits. This overburden normally contains some nickel, e.g. 0.1 to 0.8%, but not enough to permit its economic treatment by the standard reduction-ammonium carbonate leach process. Another iron oxide source material which is particularly suitable where it is readily available to low cost is tailings derived from ammonium carbonate leaching of reduced high iron nickeliferous limonite. Other non-contaminating iron oxide bearing materials may also be utilized in the method of the invention but economic considerations generally will dictate the use of the most readily available and inexpensive materials.

Where the added material is low grade nickeliferous limonite, e.g. overburden, or leach tailings, the moisture content of the material is usually comparatively high and preferably should be lowered in a drying step to enable the reduction roast to proceed efficiently.

The ore-additive mixture is preferably comminuted to substantially 100% minus 100 mesh standard Tyler Screen. The ground mixture may also be pelletizing by conventional pelletizing procedures to increase the bulk density and to reduce problems of dust control. Pelletizing does not affect the efficiency of the reduction step itself but it usually enables a higher throughput of ore due to the greater bulk density of pelletized material.

The mixture is charged into a furnace and is heated under controlled conditions in contact with reducing agents to reduce the nickel and cobalt oxides in the ore to leachable form with minimum accompanying reduction of iron oxide to metal. Reducing agents which are suitable for use in the present process when employed under proper operating conditions include producer gas, solid reductants such as coal or coke, hydrogen, carbon monoxide or mixtures thereof. The preferred agents are hydrogen and carbon monoxide. The reducing reaction can be conducted in conventional roasting apparatus such as a multiple hearth furnace, rotary kiln or fluid-solids roaster. It is generally conducted at a temperature in the range of about 550° C. to about 870° C., preferably from 600° C. to about 760° C. and is continued to reduce the nickel oxide and cobalt oxide, if present in the ore, to a leachable state with a minimum accompanying reduction of iron oxide to metallic iron. It is particularly important that the ore-reductant ratio, the water content of the furnace atmosphere and the roasting time and temperature be carefully controlled to ensure that a minimum amount of iron oxide, preferably no more than 10% by weight, is reduced to a soluble form.

The water content of the furnace atmosphere is an important factor in minimizing reduction of iron to soluble form. Generally, it is preferred to maintain the water content of the atmosphere at a level equivalent to a $H_2O/H_2$ molar ratio, or $CO_2/CO$ molar ratio where the reductant is CO, within the range of about 0.2 to about 1.0.

The retention time in the furnace at reduction temperature must also be carefully controlled in order to ensure maximum reduction of nickel and cobalt and minimum reduction of iron to soluble form. Generally, the retention time will be less than 60 minutes and in most cases from about 5 to about 45 minutes.

The calcined ore is leached with aqueous ammoniacal ammonium carbonate solution under oxidizing conditions to obtain extraction of nickel and cobalt. Leaching is conducted at ambient temperatures in the presence of free oxygen which is provided, for example, by sparging air into the leach vessel. The present invention is not concerned with the leaching and subsequent procedures for the recovery of the nickel and cobalt in marketable form. Any of the known procedures may be combined with the procedures of the present invention. U.S. Pat. No. 3,141,765 describes in detail one leaching procedure and method for the separate recovery of the nickel and cobalt values although, of course, there are other known procedures which are also suitable.

The following table illustrates the improved results obtainable in the treatment of serpentinic ores in accordance with the invention. In each test, a 135 gram sample of the feed material was heated in a laboratory tube furnace at 1,300° F. for about 40 minutes in contact with flowing hydrogen. The reduced calcines were leached for 5 hours at 110° C. with air sparging in ammonium carbonate solution containing 50 g.p.l. ammonia and 95 g.p.l. ammonium carbonate. The leach-end slurry was filtered the residue repulp washed with leach liquor and then displacement washed with leach liquor. The residues were dried and analyzed for Ni, Co and Fe.

TABLE

| Test No. | Head material | Head analysis (weight percent) | | | | | | Residue analysis (weight percent) | | | Percent extraction (weight percent) | |
|---|---|---|---|---|---|---|---|---|---|---|---|---|
| | | Ni | Co | Fe | Mg | SiO₂ | Al | Ni | Co | Fe | Ni | Co |
| 1 | "A" Serpentine | 1.85 | 0.015 | 7.49 | 19.3 | 35.6 | 1.6 | 1.15 | 0.013 | 8.68 | 46.5 | 25.5 |
| 2 | "B" Serpentine | 2.03 | 0.014 | 6.07 | 19.7 | 37.1 | 1.6 | 1.70 | – | 60.5 | 15.7 | – |
| 3 | Overburden [1] | 0.34 | 0.042 | 48.5 | – | – | – | 0.17 | 0.035 | 55.4 | 56.1 | 26.7 |
| 4 | Tailings [2] | 0.39 | 0.08 | 55.7 | – | – | – | 0.20 | – | 57.1 | 50.0 | – |
| 5 | 40 "A" Serpentine/60 Overburden | 0.95 | 0.039 | 32.6 | 7.72 | 14.24 | 0.04 | 0.27 | 0.026 | 34.3 | 73.0 | 36.6 |
| 6 | 60 "A" Serpentine/40 Overburden | 1.25 | 0.028 | 24.1 | 0.58 | 1.56 | 0.96 | 0.38 | 0.017 | 27.3 | 73.1 | 46.1 |
| 7 | 50 "A" Serpentine/50 Tailings | 1.12 | 0.046 | 31.6 | 9.65 | 17.8 | 0.8 | 0.32 | 0.029 | 32.0 | 71.8 | 37.7 |
| 8 | 43 "B" Serpentine/57 Hydrated Iron Oxide | 0.89 | 0.006 | 47.8 | 8.47 | 15.75 | 0.69 | 0.42 | – | 46.6 | 51.4 | – |

[1] Low nickel limonitic material from same area as "A" Serpentine.
[2] Tailings from ammonium carbonate leaching of reduced nickeliferous limonite from same area as "A" Serpentine.
[3] Nickel free hydrated iron oxide.

From an examination of the Table, the calculated incremental increases in nickel extractions from the serpentine resulting from the addition of the iron oxide containing additive are as follows:

| Ore | Additive | Increase in nickel extraction |
|---|---|---|
| "A" | 60% overburden | 69% |
| "A" | 40% overburden | 61% |
| "A" | 50% leach tailings | 64% |
| "B" | 57% hydrated iron oxide | 227% |

From the foregoing, it is apparent that the addition of iron oxide bearing material to a low iron nickeliferous weathered serpentine ore gives rise to a surprising increase in the extraction of the contained nickel by the reduction-ammonium carbonate leach process. It is clear that the nickel extraction is not an average of the nickel extraction of each constituent of the mixture, but that there is a marked synergistic effect when the constituents are combined and treated by the reduction-roast-ammonium carbonate leach process.

What we claim as new and desire to protect by Letters Patent of the United States is:

1. In a process of treating nickeliferous laterite ores containing less than about 5% by weight water in which the ore is calcined under controlled reducing conditions to convert contained nickel values to a leachable state and the calcined ore is leached with aqueous ammoniacal ammonium carbonate solution in contact with free oxygen containing gas to extract nickel values, the improved method for treating low iron nickeliferous weathered serpentine ores by said process whereby substantially increased nickel extractions are obtained therefrom which comprises: mixing the said weathered serpentine ore, prior to calcining, with an iron oxide bearing additive material which is substantially free of impurities that would tend to introduce unwanted contaminants into said ammoniacal ammonium carbonate leach solution and which contains less than about 0.8% nickel, said additive material being added in an amount sufficient to provide an iron content in the mixture of between about 20% and about 60% by weight.

2. The improved method according to claim 1 wherein said additive material is overburden material.

3. The improved method according to claim 1 wherein the additive material is tailings derived from ammonium carbonate leaching of reduced high iron nickeliferous limonite.

4. The improved method according to claim 1 wherein sufficient of said additive material is added to provide an iron content in the mixture of from 30 to 50 % by weight.

* * * * *